US009619556B1

(12) United States Patent
Ilkal et al.

(10) Patent No.: US 9,619,556 B1
(45) Date of Patent: Apr. 11, 2017

(54) TECHNIQUES FOR DETERMINING OWNERSHIP OF FILES AND/OR EMAIL MESSAGES

(71) Applicant: Veritas Technologies LLC, Mountain View, CA (US)

(72) Inventors: Wasim Ilkal, Pune (IN); Sachin Raut, Pune (IN); Krishna Ghodke, Pune (IN)

(73) Assignee: Veritas Technologies LLC, Mountain View, CA (US)

( * ) Notice: Subject to any disclaimer, the term of this patent is extended or adjusted under 35 U.S.C. 154(b) by 204 days.

(21) Appl. No.: 14/479,924

(22) Filed: Sep. 8, 2014

(51) Int. Cl.
*G06F 17/00* (2006.01)
*G06F 17/30* (2006.01)
*H04L 12/58* (2006.01)

(52) U.S. Cl.
CPC ........ *G06F 17/30705* (2013.01); *H04L 51/00* (2013.01)

(58) Field of Classification Search
CPC .... G06F 17/30; G06F 17/00; G06F 17/30011; G06F 17/30705
USPC .................................................. 707/600–899
See application file for complete search history.

(56) References Cited

U.S. PATENT DOCUMENTS

2004/0186894 A1* 9/2004 Jhingan ................ G06Q 10/107
709/207

* cited by examiner

*Primary Examiner* — Isaac M Woo
(74) *Attorney, Agent, or Firm* — Wilmer Cutler Pickering Hale and Dorr LLP

(57) ABSTRACT

Techniques for determining ownership of files and/or email messages are disclosed. In one embodiment, the techniques may be realized as a method including determining a distribution of a plurality of email messages within a file; selecting a preset number of email messages based on the determined distribution of the plurality of email messages within the file; extracting metadata from each of the preset number of email messages; classifying each of the preset number of email messages based on the extracted metadata; determining an owner of each of the preset number of email messages based on the classification of each email message by analyzing the metadata of each of the preset number of email messages; calculating statistics for the preset number of email messages based on the determined owner of each of the preset number of email messages; and assigning ownership to the file based on the calculated statistics.

20 Claims, 8 Drawing Sheets

| Folder Name | Message Distribution | No. messages to be randomly scanned |
|---|---|---|
| Inbox | 2000 | 250 (Sampled 5% more items i.e. 50 more items which is 5% of 1000) = 12.5% |
| Folder 1 | 3000 | 281 (Adjusted count to balance extra 5% given to special folder) = 9.36% |
| Sub Folder 1.1 | 2000 | 188 (Adjusted count to balance extra 5% given to special folder) = 9.4% |
| Sub Folder 1.2 | 1000 | 94 (Adjusted count to balance extra 5% given to special folder) = 9.4% |
| Folder 2 | 1700 | 159 (Adjusted count to balance extra 5% given to special folder) = 9.35% |
| Sub Folder 2.1 | 300 | 28 (Adjusted count to balance extra 5% given to special folder) = 9.33% |
| | Total Sample Set count = 1000 ||

Fig. 7

| | Property to extract Display Name information | Property to extract Email Address information |
|---|---|---|
| Message classified as SENT | PR_SENDER_NAME | PR_SENDER_EMAIL_ADDRESS |
| Message classified as RECEIVED | PR_RECEIVED_BY_NAME | PR_RECEIVED_BY_EMAIL_ADDRESS |
| Message classified as SENT but delegated to another user | PR_SENT_REPRESENTING_NAME | PR_SENT_REPRESENTING_EMAIL_ADDRESS |
| Message classified as RECEIVED but delegated to another user | PR_RCVD_REPRESENTING_NAME | PR_RCVD_REPRESENTING_EMAIL_ADDRESS |

Fig. 8

TECHNIQUES FOR DETERMINING OWNERSHIP OF FILES AND/OR EMAIL MESSAGES

FIELD OF THE DISCLOSURE

The present disclosure relates generally to archival of email and, more particularly, to techniques for determining ownership of files and/or email messages.

BACKGROUND OF THE DISCLOSURE

As the use of email grows, the need to archive or migrate email from client terminals to remote servers increases. Archiving or migration of email messages may be needed as a result of increased data usage and limited client computing capabilities, eDiscovery requirements, or compliance requirements. In some instances, email messages may be stored as part of a Personal Storage Table (.pst) file associated with Microsoft® Exchange. As part of an email archive system, all or a portion of a .pst file may be backed up from a client terminal to at least one remote server. Determining the proper owner of a .pst file for archival purposes is critical to ensure that the email messages are associated with the proper user and accurately stored for future retrieval. Traditional techniques for determining the owner of a .pst file require a network administrator to manually assign an owner or are based on various file or folder permissions. However, traditional techniques for determining the proper owner of a .pst file are time consuming and can be inaccurate.

In view of the foregoing, it may be understood that there may be significant problems and shortcomings associated with traditional email message ownership determination.

SUMMARY OF THE DISCLOSURE

Techniques for determining ownership of files and/or email messages are disclosed. In one embodiment, the techniques may be realized as a method for determining file ownership comprising determining, using at least one processor, a distribution of a plurality of email messages within a file; selecting a preset number of email messages based on the determined distribution of the plurality of email messages within the file; extracting metadata from each of the preset number of email messages; classifying each of the preset number of email messages based on the extracted metadata; determining an owner of each of the preset number of email messages based on the classification of each email message by analyzing the metadata of each of the preset number of email messages; calculating statistics for the preset number of email messages based on the determined owner of each of the preset number of email messages; and assigning ownership to the file based on the calculated statistics.

In accordance with other aspects of this embodiment, the plurality of email messages may be arranged in at least one folder of the file.

In accordance with additional aspects of this embodiment, the file may contain a plurality of folders and each folder contains at least one of the plurality of email messages.

In accordance with further aspects of this embodiment, the preset number of email messages may be randomly selected and include at least one email message from each folder.

In accordance with additional aspects of this embodiment, each of the preset number of email messages may be classified as sent or received.

In accordance with additional aspects of this embodiment, the email message may be classified as received when the email message metadata contains receiver properties and sender properties, and the email message may be classified as sent when the email message metadata contains sender properties but does not contain receiver properties.

In accordance with further aspects of this embodiment, the metadata may include Messaging Application Programming Interface (MAPI) properties.

In accordance with further aspects of this embodiment, the owner of each of the preset number of email messages may be determined by analyzing a first MAPI property of the respective email message when the respective email message is classified as sent and by analyzing a second different MAPI property of the respective email message when the respective email message is classified as received.

In accordance with additional aspects of this embodiment, the statistics may indicate a percentage of the preset number of email messages owned by the owner and the ownership to the file is assigned to the owner when the percentage exceeds a predetermined threshold.

In accordance with additional aspects of this embodiment, the file may be a Personal Storage Table (.pst) file.

In accordance with additional aspects of this embodiment, the owner may be one of a plurality of email users.

In accordance with additional aspects of this embodiment, the method may further include accessing the file containing the plurality of email messages.

In accordance with additional aspects of this embodiment, the file may be stored in memory on a client terminal.

In accordance with additional aspects of this embodiment, the method may further include archiving the file to a remote server based on the assigned ownership.

In another embodiment, the techniques may be realized as a method for determining an owner of an email message comprising extracting, using at least one processor, metadata from the email message, wherein the metadata includes Messaging Application Programming Interface (MAPI) properties; classifying the email message as sent or received based on the extracted metadata; and determining an owner of the email message based on the classification of the email message by analyzing a first portion of the metadata when the email message is classified as sent and by analyzing a second portion of the metadata when the email message is classified as received.

In accordance with other aspects of this embodiment, the email message may be classified as received when the email message contains receiver properties and sender properties.

In accordance with additional aspects of this embodiment, the email message may be classified as sent when the email message contains sender properties but does not contain receiver properties.

In another embodiment, the techniques may be realized as at least one non-transitory processor readable storage medium storing a computer program of instructions configured to be readable by at least one processor for instructing the at least one processor to execute a computer process for performing a method including determining, using at least one processor, a distribution of a plurality of email messages within a file; selecting a preset number of email messages based on the determined distribution of the plurality of email messages within the file; extracting metadata from each of the preset number of email messages; classifying each of the preset number of email messages based on the extracted metadata; determining an owner of each of the preset number of email messages based on the classification of each email message by analyzing the metadata of each of the preset number of email messages; calculating statistics for the preset number of email messages based on the determined owner of each of the preset number of email messages; and assigning ownership to the file based on the calculated statistics.

In another embodiment, the techniques may be realized as a system for determining file ownership comprising one or more processors communicatively coupled to a network, wherein the one or more processors are configured to determine a distribution of a plurality of email messages within a file; select a preset number of email messages based on the determined distribution of the plurality of email messages within the file; extract metadata from each of the preset number of email messages; classify each of the preset number of email messages based on the extracted metadata; determine an owner of each of the preset number of email messages based on the classification of each email message by analyzing the metadata of each of the preset number of email messages; calculate statistics for the preset number of email messages based on the determined owner of each of the preset number of email messages; and assign ownership to the file based on the calculated statistics.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be illustrative only.

FIG. 7 shows an email message distribution in accordance with an embodiment of the present disclosure.

FIG. 8 shows email message ownership extraction information in accordance with an embodiment of the present disclosure.

DETAILED DESCRIPTION OF EMBODIMENTS

Figure 1:
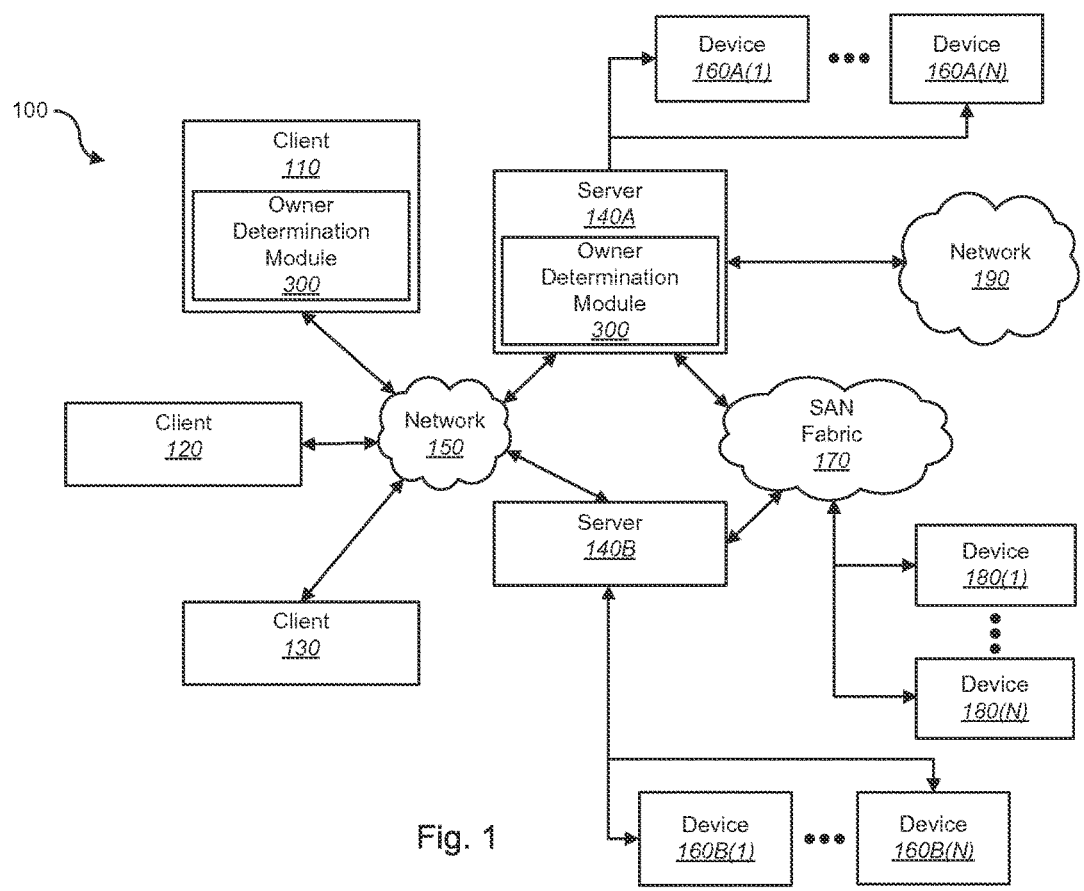
FIG. 1 shows a block diagram depicting a network architecture in accordance with an embodiment of the present disclosure.

FIG. 1 shows a block diagram depicting a network architecture 100 for determining email message ownership in accordance with an embodiment of the present disclosure. FIG. 1 is a simplified view of network architecture 100, which may include additional elements that are not depicted. Network architecture 100 may contain client systems 110, 120 and 130, as well as servers 140A and 140B (one or more of each of which may be implemented using computer system 200 shown in FIG. 2). Client systems 110, 120 and 130 may be communicatively coupled to a network 150. Server 140A may be communicatively coupled to storage devices 160A(1)-(N), and server 140B may be communicatively coupled to storage devices 160B(1)-(N). Client systems 110, 120 and 130 may contain an advanced security threat detection module (e.g., owner determination module 300). In addition, servers 140A and 140B may contain an owner determination module (e.g., owner determination module 300). Servers 140A and 140B may be communicatively coupled to a SAN (Storage Area Network) fabric 170. SAN fabric 170 may support access to storage devices 180(1)-(N) by servers 140A and 140B, and by client systems 110, 120 and 130 via network 150.

Figure 2:
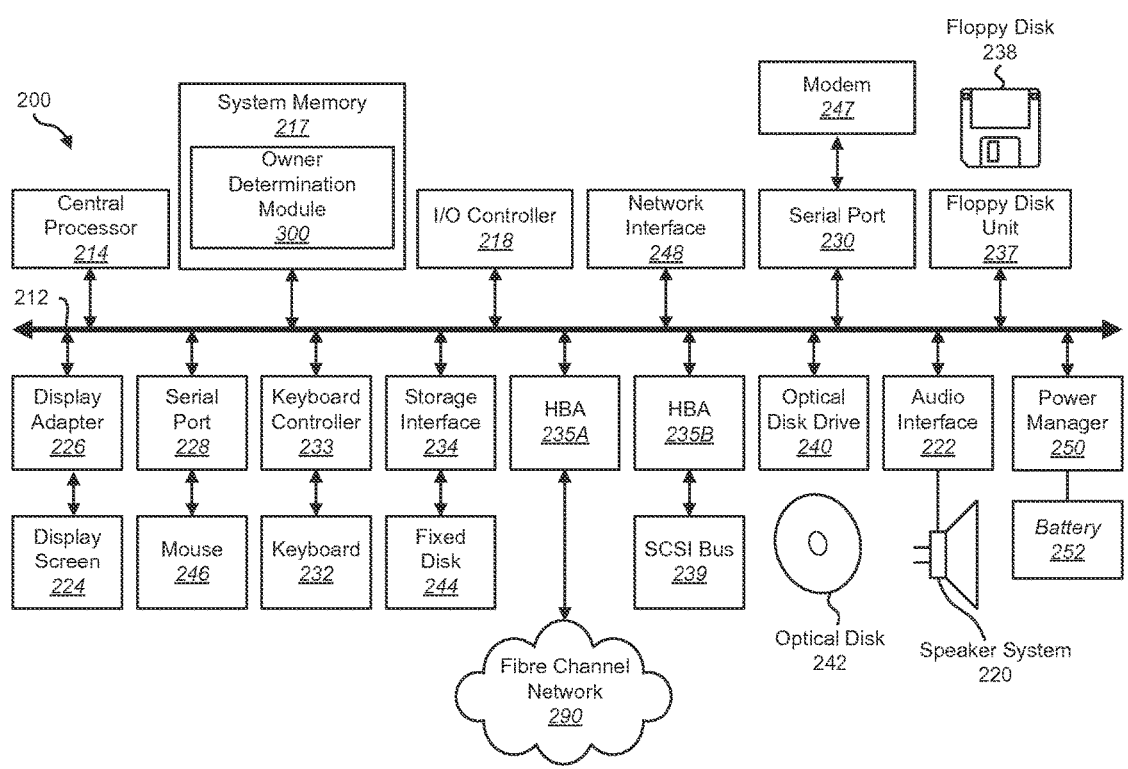
FIG. 2 shows a block diagram depicting a computer system in accordance with an embodiment of the present disclosure.

With reference to computer system 200 of FIG. 2, modem 247, network interface 248, or some other method may be used to provide connectivity from one or more of client systems 110, 120 and 130 to network 150. Client systems 110, 120 and 130 may access information on servers 140A and 140B using, for example, a web browser or other client software (not shown). Such a client may allow client systems 110, 120 and 130 to access data hosted by any one of servers 140A and 140B or one of storage devices 160A(1)-(N), 160B(1)-(N), and/or 180(1)-(N). In some embodiments, client systems 110, 120 and 130 may have an email messaging application (e.g., Microsoft® Exchange) implemented thereon, and be in communication with a backend email message archival application (e.g., Symantec Enterprise Vault®) implemented on server 140A.

Networks 150 and 190 may be local area networks (LANs), wide area networks (WANs), the Internet, cellular networks, satellite networks, or other networks that permit communication between clients 110, 120, 130, servers 140, and other devices communicatively coupled to networks 150 and 190. Networks 150 and 190 may further include one, or any number, of the exemplary types of networks mentioned above operating as a stand-alone network or in cooperation with each other. Networks 150 and 190 may utilize one or more protocols of one or more clients or servers to which they are communicatively coupled. Networks 150 and 190 may translate to or from other protocols to one or more protocols of network devices. Although networks 150 and 190 are each depicted as one network, it should be appreciated that according to one or more embodiments, networks 150 and 190 may each comprise a plurality of interconnected networks.

Storage devices 160A(1)-(N), 160B(1)-(N), and/or 180 (1)-(N) may be network accessible storage and may be local, remote, or a combination thereof to any one of servers 140A and 140B. Storage devices 160A(1)-(N), 160B(1)-(N), and/ or 180(1)-(N) may utilize a redundant array of inexpensive disks ("RAID"), magnetic tape, disk, a storage area network ("SAN"), an internet small computer systems interface ("iSCSI") SAN, a Fibre Channel SAN, a common Internet File System ("CIFS"), network attached storage ("NAS"), a network file system ("NFS"), optical based storage, or other computer accessible storage. Storage devices 160A(1)-(N), 160B(1)-(N), and/or 180(1)-(N) may be used for backup or archival purposes. For example, storage devices 160B(1)-(N) and/or 180(1)-(N) may be used to store data replicated from storage devices 160A(1)-(N).

According to some embodiments, clients 110, 120, and 130 may be smartphones, PDAs, desktop computers, laptop computers, servers, other computers or computing devices, or other devices coupled via a wireless or wired connection to network 150. Clients 110, 120, and 130 may receive data from user input, a database, a file, a web service, and/or an application programming interface. Clients 110, 120, and 130 may also implement an email messaging application.

Servers 140A and 140B may be application servers, archival platforms, backup servers, network storage devices, media servers, email servers, document management platforms, enterprise search servers, anti-malware/virus security servers, or other devices communicatively coupled to network 150. Servers 140A and 140B may utilize one of storage devices 160A(1)-(N), 160B(1)-(N), and/or 180(1)-(N) for the storage of application data, backup data, or other data. Servers 140A and 140B may be hosts, such as an application server, which may process data traveling between clients 110, 120, and 130 and a backup platform, a backup process, and/or storage.

According to some embodiments, servers 140A and 140B may be platforms used for backing up and/or archiving data. In particular, servers 140A and 140B may be platforms used for backing up and/or archiving email messages. One or more portions of data may be backed up or archived based on a backup policy and/or an archive applied, attributes associated with the data source, space available for backup, space available at the data source, or other factors. Further, the one or more portions of data that have been backed up or archived may be recovered upon occurrence of a particular event according to a failover policy. According to other embodiments, servers 140A and 140B may determine ownership of email messages from any source including clients 110, 120, and 130.

According to some embodiments, clients 110, 120, and 130 may contain one or more portions of software for determining ownership of email messages such as, for example, owner determination module 300. In addition, server 140A may contain one or more portions of software for determining ownership of email messages such as, for example, owner determination module 300. As illustrated, one or more portions of the owner determination module 300 may reside at a network centric location. According to some embodiments, network 190 may be an external network (e.g., the Internet) and server 140A may be a gateway or firewall between one or more internal components and clients and the external network. According to some embodiments, the owner determination module 300 may be implemented as part of a cloud computing environment.

FIG. 2 shows a block diagram of a computer system 200 in accordance with an embodiment of the present disclosure. Computer system 200 is suitable for implementing techniques in accordance with the present disclosure. Computer system 200 may include a bus 212 which may interconnect major subsystems of computer system 200, such as a central processor 214, a system memory 217 (e.g. RAM (Random Access Memory), ROM (Read Only Memory), flash RAM, or the like), an Input/Output (I/O) controller 218, an external audio device, such as a speaker system 220 via an audio output interface 222, an external device, such as a display screen 224 via display adapter 226, serial ports 228 and 230, a keyboard 232 (interfaced via a keyboard controller 233), a storage interface 234, a floppy disk drive 237 operative to receive a floppy disk 238, a host bus adapter (HBA) interface card 235A operative to connect with a Fibre Channel network 290, a host bus adapter (HBA) interface card 235B operative to connect to a SCSI bus 239, and an optical disk drive 240 operative to receive an optical disk 242. Also included may be a mouse 246 (or other point-and-click device, coupled to bus 212 via serial port 228), a modem 247 (coupled to bus 212 via serial port 230), network interface 248 (coupled directly to bus 212), power manager 250, and battery 252.

Bus 212 allows data communication between central processor 214 and system memory 217, which may include read-only memory (ROM) or flash memory (neither shown), and random access memory (RAM) (not shown), as previously noted. The RAM may be the main memory into which the operating system and application programs may be loaded. The ROM or flash memory can contain, among other code, the Basic Input-Output system (BIOS) which controls basic hardware operation such as the interaction with peripheral components. Applications resident with computer system 200 may be stored on and accessed via a computer readable medium, such as a hard disk drive (e.g., fixed disk 244), an optical drive (e.g., optical drive 240), a floppy disk unit 237, a removable disk unit (e.g., Universal Serial Bus drive), or other storage medium. According to some embodiments, the owner determination module 300 may be resident in system memory 217.

Storage interface 234, as with the other storage interfaces of computer system 200, can connect to a standard computer readable medium for storage and/or retrieval of information, such as a fixed disk drive 244. Fixed disk drive 244 may be a part of computer system 200 or may be separate and accessed through other interface systems. Modem 247 may provide a direct connection to a remote server via a telephone link or to the Internet via an internet service provider (ISP). Network interface 248 may provide a direct connection to a remote server via a direct network link to the Internet via a POP (point of presence). Network interface 248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 2 need not be present to practice the present disclosure. The devices and subsystems can be interconnected in different ways from that shown in FIG. 2. Code to implement the present disclosure may be stored in computer-readable storage media such as one or more of system memory 217, fixed disk 244, optical disk 242, or floppy disk 238. Code to implement the present disclosure may also be received via one or more interfaces and stored in memory. The operating system provided on computer system 200 may be MS-DOS®, MS-WINDOWS®, OS/2®, OS X®, UNIX®, Linux®, or another known operating system.

Power manager 250 may monitor a power level of battery 252. Power manager 250 may provide one or more APIs (Application Programming Interfaces) to allow determination of a power level, of a time window remaining prior to shutdown of computer system 200, a power consumption rate, an indicator of whether computer system is on mains (e.g., AC Power) or battery power, and other power related information. According to some embodiments, APIs of power manager 250 may be accessible remotely (e.g., accessible to a remote backup management module via a network connection). According to some embodiments, battery 252 may be an Uninterruptable Power Supply (UPS) located either local to or remote from computer system 200. In such embodiments, power manager 250 may provide information about a power level of an UPS.

Figure 3:
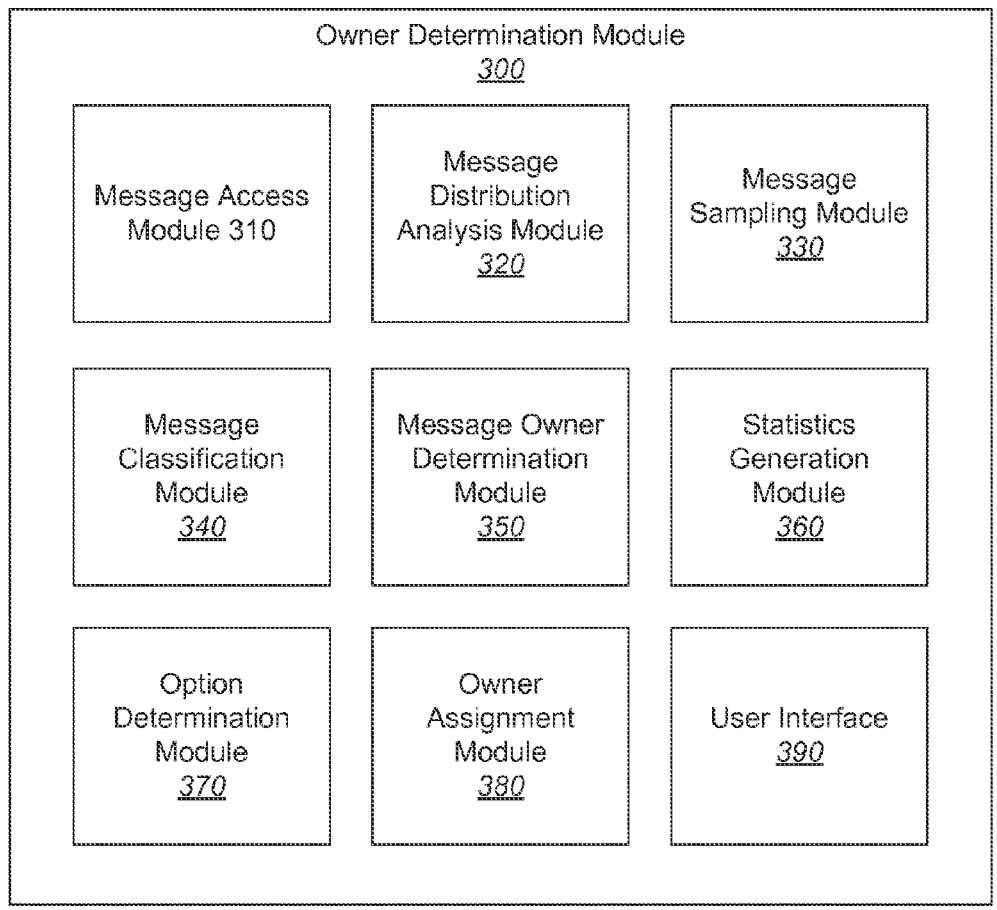
FIG. 3 shows an owner determination module in accordance with an embodiment of the present disclosure.

FIG. 3 shows an owner determination module 300 in accordance with an embodiment of the present disclosure. As illustrated, the owner determination module 300 may contain one or more components including a message access module 310, a message distribution analysis module 320, a message sampling module 330, a message classification module 340, a message owner determination module 350, a statistics generation module 360, an option determination module 370, an owner assignment module 380, and a user interface 390.

The message access module 310 may access email messages within an email system. For example, the message access module 310 may access email messages within a Microsoft® Exchange email system implemented within a network. In addition, the message access module 310 may access email messages within the email system across a plurality of user accounts as part of an archival and backup email system. In some embodiments, only email messages within a specific email server environment may be accessed for further analysis by the owner determination module 300. Further, the message access module 310 may also access .pst files containing email messages for further analysis by the owner determination module 300.

The message distribution analysis module 320 may analyze email messages accessed by the message access module 310 to determine how those messages are distributed across one or a plurality of folders. For example, the message distribution analysis module 320 may analyze email messages stored in a .pst file to determine the folder structure (e.g., inbox, outbox, sent messages, folders, subfolders, etc.) and how many email messages are arranged within that folder structure. In some instance, the message distribution analysis module 320 may determine the number of email messages arranged in each folder or subfolder.

The message sampling module 330 may select and sample a subset of the email messages accessed by the message access module 310. In some instances, the message sampling module 330 may randomly select the subset of email messages to determine additional aspects about the email messages. Following selection, the message sampling module 330 may sample or exact information relevant to the owner from the email message. In particular, metadata associated with the email messages may be collected. In some instances, the metadata sampled by the message sampling module 330 may be Messaging Application Programming Interface (MAPI) properties. FIG. 8 describes various aspects of the MAPI properties collected by the message sampling module 330 and used to determine the owner of the message.

In some embodiments, the sampling of email messages may be restricted by a maximum scanning cap. For example, the message sampling module 330 may only analyze a maximum of 10% of the total number of email messages identified by message distribution analysis module 320. In another example, the message sampling module 330 may only analyze a maximum of 10% of the total number of email messages identified by message distribution analysis module 320 within a .pst file. The message sampling module 330 may also give weight to certain folders over others. For example, the message scanning module 330 may sample more items in the inbox and/or the sent messages folder.

The message classification module 340 may classify each message sampled by the message sampling module 330 as sent or received. In some instance, the message classification module 340 may classify the messages based on the metadata sampled by the message sampling module 330. In some embodiments, the metadata may be MAPI properties of the email messages. For example, if an email message contains the MAPI property PR_RECEIVED_BY_NAME, then that email message has been received by some email messaging user and the email message may be classified as "received." If an email message does not contain the MAPI property PR_RECEIVED_BY_NAME, then that email message has been sent by some messaging user and the email message may be classified as "sent." Additional details of the MAPI properties are described below with respect to FIG. 8.

The message owner determination module 350 may determine an owner for each email message based on the metadata sampled by the message sampling module 330 and the classification of the message from the message classification module 340. In some instances, the metadata used to determine the owner may be MAPI properties of email messages. For example, for messages classified as sent, PR_SENDER_NAME, PR_SENDER_EMAIL_ADDRESS, PR_SENT_REPRESENTING_NAME, PR_SENT_REPRESENTING_EMAIL_ADDRESS properties may be used to extract owner information. For messages classified as received, PR_RCVD_REPRESENTING_NAME, PR_RCVD_REPRESENTING_EMAIL_ADDRESS, PR_RECEIVED_BY_NAME, PR_RECEIVED_BY_EMAIL_ADDRESS properties may be used to extract owner information.

The statistics generation module 360 may generate statistics regarding the email messages analyzed. In some instances, these statistics may be used to determine users that may be owners (e.g., candidate owners) of the analyzed email messages. For example, the statistics generation module 360 may generate statistics regarding a .pst file to determine an owner of the .pst file. In some embodiments, the statistics generation module 360 may generate statistics relating to the assigned owner of the email message from the message owner determination module 350, the email address of the email message, the number of email messages associated with that assigned owner, and the percentage of email messages associated with an assigned owner in relation to the total number of sampled email messages.

The option determination module 370 may provide a variety of configuration settings used to implement the owner determination processes as described herein. For example, the option determination module 370 may receive user inputs via the user interface 390 to specify whether to utilize the owner determination process as part of a message archiving process, a minimum number of messages to be sampled, and a maximum number of messages to be sampled. The chart below provides various examples of configuration settings that may be managed by the option determination module 370:

| Setting | Type | Default/Range | Description |
| --- | --- | --- | --- |
| UseMessageSampling | Boolean | Default: 0<br>Range: 0 to 1 | Enables Message Sampling method for PST Ownership Identification.<br>0: True<br>1: False |
| MessageSamplingOption | Numeric | Default: 0<br>Range: 0 to 1 | Specifies when to use message sampling to look for possible owners of PST files.<br>0: Use message sampling only if PST file marking fails or the files are unmarked. Here message sampling will be used when all other ownership identification method fails. |

| Setting | Type | Default/Range | Description |
| --- | --- | --- | --- |
| | | | 1: Use message sampling first and then fall back to other method if it fails. |
| SamplePercent | Numeric | Default: 80 Range: 1 to 100 | The maximum percentage of the PST file contents to sample to look for the possible owner. |
| MinSampleCount | Numeric | Default: 100 Range: 100 to 1000 | The minimum number of items to scan per PST file to look for the possible owner. If PST file has less items than Min Sample Count then sampling percentage is ignored and all the items are sampled. |
| MaxSampleCount | Numeric | Default: 10000 Range: 1000 to 1000000 | The maximum number of items to scan per PST file to look for the possible owner. |
| UniqueOwnerPercent | Numeric | Default: 70 Range: 1 to 100 | Assign ownership to users with this percentage of associated emails in case multiple possible owners are found. |
| AlwaysSelectMostLikelyOwner | Boolean | Default: 1 Range: 0 to 1 | Specifies whether to assign ownership to user with maximum associated emails in the PST file. 0: True 1: False |
| FailureOption | Numeric | Default: 0 Range: 0 to 1 | Specifies what to do with the PST file if ownership identification fails. 0: Keep as unassigned 1: Assign to the default archive. |
| MessageTypeExcludeList | String | Default: IPM.Note.Microsoft.Conversation | A comma-separated list containing MAPI message classes for each message that will be excluded during the ownership identification scan. By default, this is set to IPM.Note.Microsoft.Conversation. |
| ConfidencePercentage | Numeric | Default: 80 Range: 80 to 100 | The percentage of associated emails that will decide the possible owner. When this criteria is met, the PST file will move to the 'Ready to copy' state. |

The owner selection module 380 may select and assign an owner to a collection of email messages analyzed by the owner determination module 300. In some embodiments, the owner selection module 380 may select and assign an owner to a .pst file analyzed by the various modules of the owner determination module 300 as described above. In some instances, the owner determination module 300 may select an owner of the .pst file as the user with the maximum percentage share of email messages sampled in the .pst file and identified by the statistics generation module 360.

The user interface 390 may provide a user or administrator with an interface to control any aspect to the processes described herein. For example, the user interface 390 may display information about the owner of a .pst file assigned by the owner assignment module 380, the selected options of the option determination module 370, statistics generated by the statistics generation module 360, message owners determined by the message owner determination module 350, message classifications determined by the message classification module 340, and message distributions determined by the message distribution analysis module 320.

Figure 4:
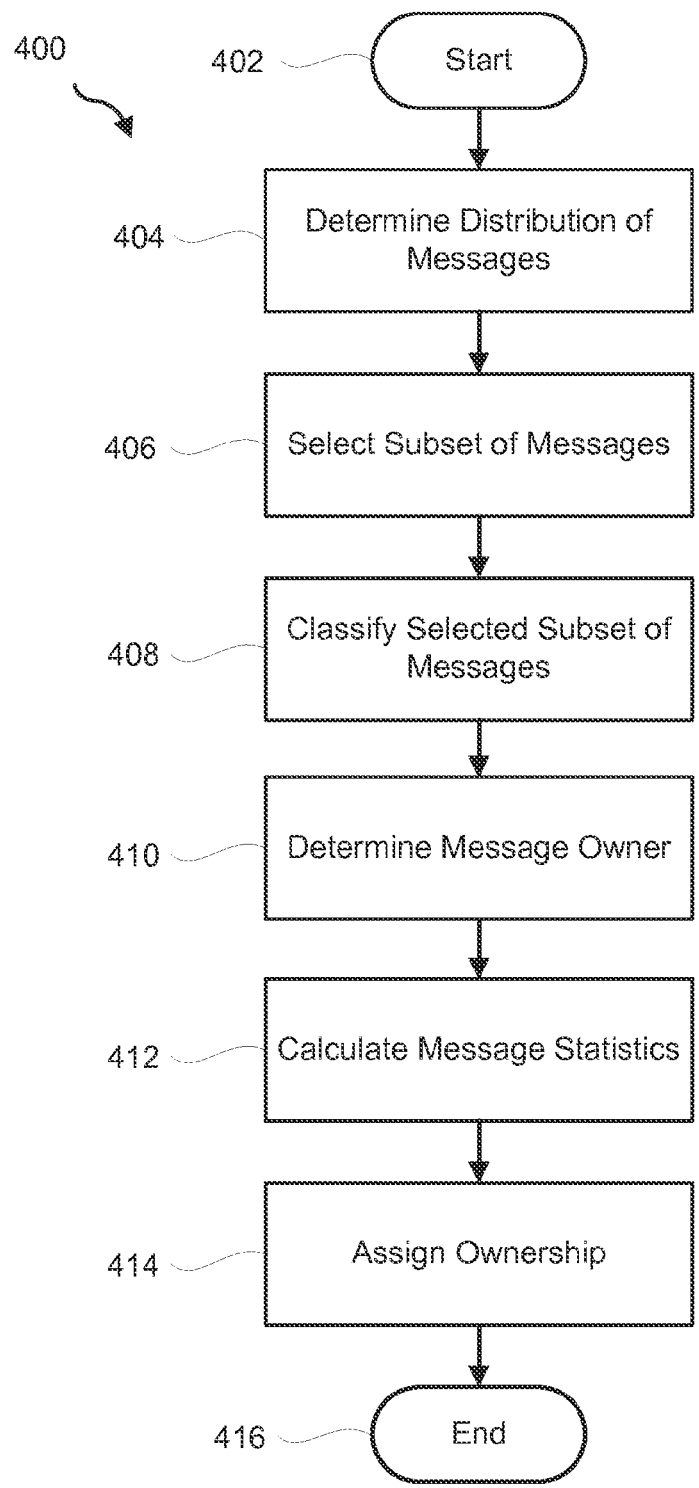
FIG. 4 shows a method for determining ownership in accordance with an embodiment of the present disclosure.

FIG. 4 shows a method 400 for determining ownership in accordance with an embodiment of the present disclosure. The method 400 may be performed across multiple devices including for example clients 110, 120, 130, and server 140A independently and concurrently. However, any portion of the method 400 described below may be performed on any one of clients 110, 120, 130, and server 140A at any time. In some embodiments, method 400 may be implemented as part of an email message archiving workflow. At block 402, the method 400 may begin.

Figure 6:
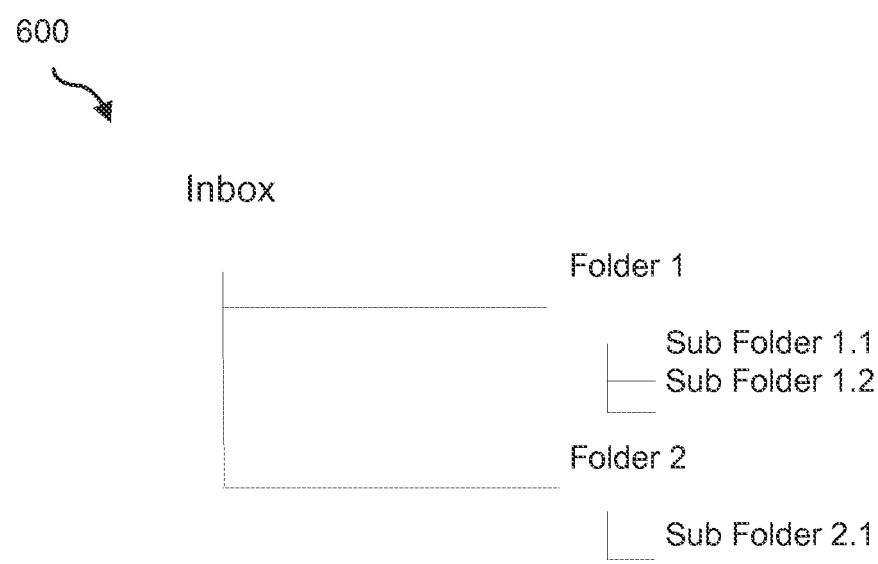
FIG. 6 shows a folder structure in accordance with an embodiment of the present disclosure.

At block 404, a distribution of email messages may be determined. In some embodiments, the distribution of email messages may be determined by the message distribution analysis module 320. Email messages may be distributed across one or a plurality of folders and subfolders for a particular set of emails under analysis. In some instances, the email messages may be contained with a .pst file. The distribution of messages within the .pst file may be analyzed to determine the folder structure of the .pst file (e.g., inbox, outbox, sent messages, folders, subfolders, etc.) and how many email messages are arranged within that folder structure. The total number of email messages within the .pst file ("t") may also be determined. FIG. 6 described below shows one example of a folder structure within a .pst file. FIG. 7 described below shows one example of a distribution of emails within the folder structure of the .pst file. After the distribution of email messages has been determined, the overall process may then proceed to block 406.

At block 406, a subset or percentage of the email messages may be selected for analysis at block 404. In some embodiments, email messages may be selected by the message sampling module 330. The sample percentage ("s") of the emails to be analyzed may be a percentage of the total emails ("t") identified at block 404. The sample percentage ("s") may also be set by a user or administrator. Additional configuration settings for sampling (e.g., maximum number of sampled email messages) may be specified by a user as described above with respect to the option determination module 370. In some instances, email messages to be analyzed or sampled may be randomly selected from each folder and subfolder identified at block 404. The number of messages selected from each folder may vary. For example, a larger number of messages may be selected from the inbox and sent messages folders so as to give more weight to the messages within these folders.

In some embodiments, certain messages may be excluded from the subset of messages selected. For example, only email messages originating from and received an Exchange server environment may be sampled. Messages originating from outside of the Exchange server environment may accordingly be excluded from the sampling.

As part of the email message selection, MAPI properties of the email messages may also be utilized to filter or excluded certain email messages and folders within a .pst file from further analysis. Such email messages and folders may yield an inaccurate owner result if included in the analysis. A .pst file may contain many types of folders and messages. To reduce the number of email messages necessary for analysis, certain folders may be excluded in the sampling. For example, the PR_CONTAINER_CLASS MAPI property may be used to identify folders in a container class of IPM.Note. Folders having this container class may be included from the subset of messages selected for further analysis while folders not having this container class may be excluded. In addition, where the PR_CONTAINER_CLASS MAPI property for a particular folder does not exist, that folder may also be excluded from the subset.

To further reduce the number of email messages to be analyzed, certain types of email messages may be excluded from the subset of messages selected for further analysis. For example, if the MAPI property PR_MESSAGE_CLASS for a particular message is IPM.Note, then that message may be included in the subset of messages for further analysis while the remaining message classes may be excluded. In addition, unsent messages may be excluded. Some message types that extend from the IPM.Note class may also be excluded. For instance, Microsoft® Office Communicator chat histories within the IPM.Note.Microsoft.Conversation class may be excluded. After the subset of the subset of email messages has been selected, the overall process may proceed to block 408.

At block 408, the selected subset of messages may be classified. In some embodiments, the messages may be classified by the message classification module 340. In particular, each selected message may be classified as either sent or received. Metadata may be extracted from the subset of email messages and analyzed to determine whether the message has been sent or received with respect to the .pst file. In some embodiments, the metadata may be MAPI properties. For example, if an email message has both receiver properties and sender properties then it may be classified as received. However, if the email message has only sender properties then it may be classified as sent with respect to the .pst file. After the messages have been classified, the overall process may then proceed to block 410.

At block 410, an owner for each classified message may be determined. In some embodiments, the message owner determination module 350 may determine the owner of each classified message from block 408. The message owner may be determined in accordance with the classification assigned at block 408. For example, messages classified as sent may have owner information extracted from one set of metadata while messages classified as received may have owner information extracted from another set of metadata. In particular, the MAPI properties may be used to extract certain owner information. FIG. 8 described in detail below provides one example of how the MAPI properties may be used to determine an owner for each message. After the owner for each classified message has been determined, the overall process may then proceed to block 412.

At block 412, message statistics may be calculated. In some embodiments, the statistics generation module 360 may generate the message statistics. In particular, statistics relating to owner names, email addresses, email message counts, and percentage of total sampled email messages may be calculated. After the message statistics have been calculated, the process may proceed to block 412.

At block 412, ownership of the email messages may be assigned. In some embodiments, the owner assignment module 380 may assign an owner to the email messages. In some instances, the candidate who simply has the maximum percentage share of items in the .pst file may be selected as the owner of the .pst file. In other instances, a success criteria ("sc") may be utilized in the assignment process. The success criteria may indicate a minimum percentage of emails that must belong to a same owner in order to identify that user as the owner of the .pst file. For example, it may be determined that user A owns 55% of the messages within the .pst file and the success criteria is 40%. In this case, user A may be assigned as the owner and user A's email address or display name may be matched with available Exchange mailbox users. Accordingly, the .pst file may be migrated to user A's archive.

However, if user A owns the highest share of email messages within a .pst file at 35% ownership, user A's ownership percentage would be below the success criteria of 40%. In this instance, an owner of the .pst file may not be assigned and the information generated in the previous blocks may be displayed to a user or administrator. Additionally, this information may be stored as part of the .pst file analyzed.

In another instance, it may be determined that user A and user B each own 40% of the email messages within .pst file. In this situation, an owner of the .pst file may not be assigned and the information generated in the previous blocks may be displayed to a user or administrator. Additionally, this information may be stored as part of the .pst file.

In a further situation, user A may be identified as the owner of the .pst file. However, a comparison of the owner of the .pst file with available email address and display name information associated with email archives may reveal that no archive exists for user A or that user A does not have archive privileges. In this case, the owner information may be displayed to a user or administrator and/or stored as part of the .pst file.

During the message analysis, multiple owner candidates may be identified that own approximately the same amount of email messages within the .pst file. For example, user A may own 37%, user B may own 39%, and user C may own 24% of the subset of email messages analyzed. In this case, user A and user B have similar percentages of ownership and are within a predefined percent delta range (e.g., 5%). This may happen either because of randomness of email selection or a true distribution of ownership. As a result, a retry may be performed such that the overall process may proceed back to block 406 and blocks 406-414 may be performed on a different set of email messages within the .pst file. If the retry results in a user having ownership greater than the predefined percent delta range (e.g., user A has 42% while user B has 32%), then that user may be selected as the owner of the .pst file owner. However, if the retry does not result in a user having ownership greater than the predefined percent delta range (e.g., user A has 39% while user B has 35%), then no user may be selected as the owner of the .pst file owner or another retry may be performed.

After the ownership of the email messages has been assigned, the process may proceed to block 416. The overall process 400 may then repeat periodically or continuously. In particular, the overall process 400 may be implemented with respect to a plurality of .pst files at one time or sequentially.

Figure 5:
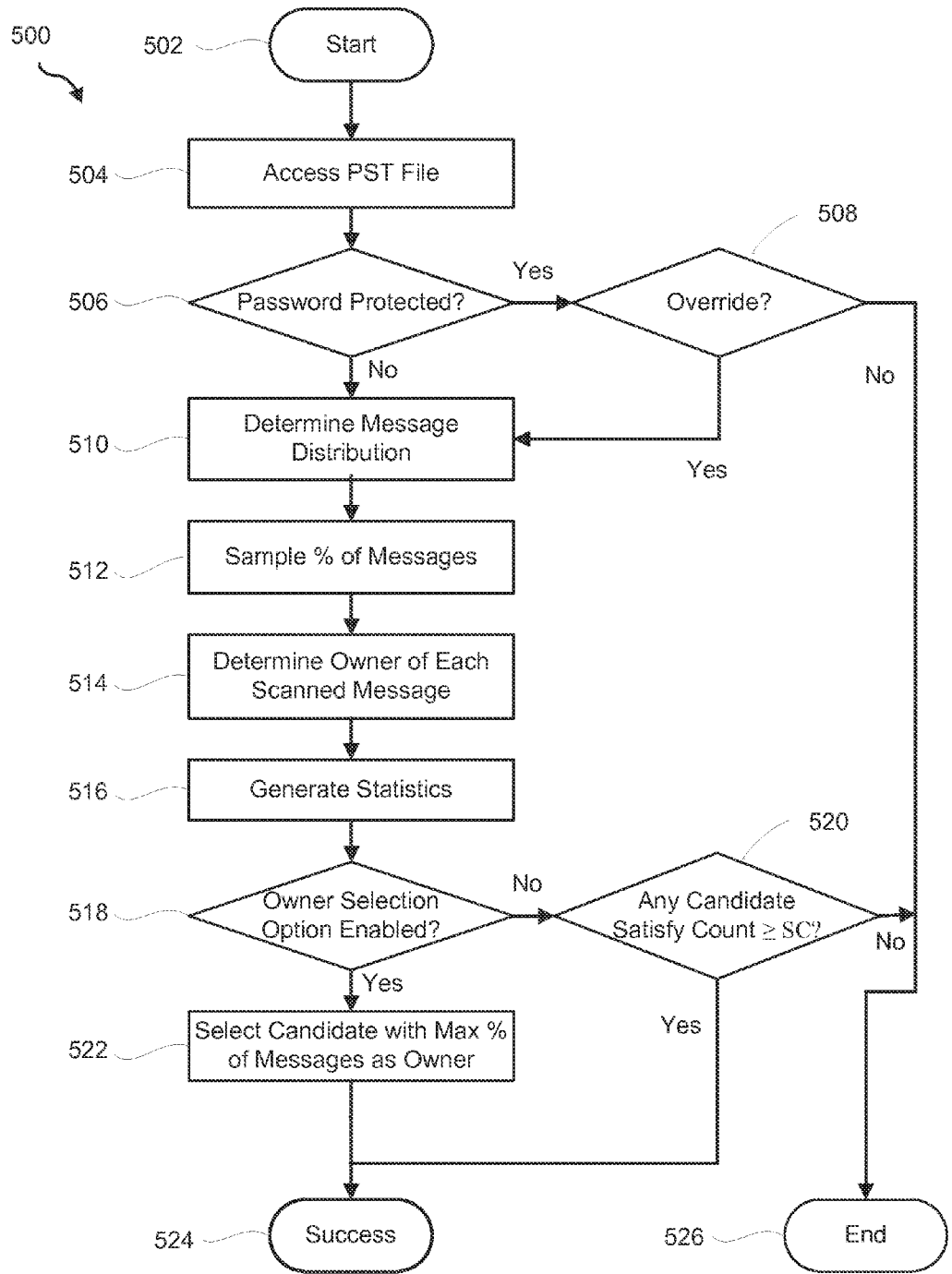
FIG. 5 shows a method for determining ownership in accordance with an embodiment of the present disclosure.

FIG. 5 shows a method 500 for determining ownership in accordance with an embodiment of the present disclosure. The method 500 may be performed across multiple devices including for example clients 110, 120, 130, and server 140A independently and concurrently. However, any portion of the method 400 described below may be performed on any one of clients 110, 120, 130, and server 140A at any time. At block 502, the method 500 may begin.

At block 504, a Personal Storage Table (.pst) file may be accessed. In some embodiments, the message access module 310 may access the .pst file. The .pst file may contain a plurality of email messages stored in various folders and subfolders as described herein. In some instances, the .pst file may be stored at a client terminal and utilized by one or a plurality of email users. After accessing the .pst file, the process may proceed to block 506.

At block 506, is may be determined whether the .pst file accessed at block 504 is password protected. In some embodiments, the message access module 310 may determine whether the .pst file is password protected. If it is determined that the .pst file is password protected, the overall process may proceed to block 508. However, if it is determined that the .pst file is not password protected, the overall process may proceed to block 510.

At block 508, it may be determined whether the password may be overridden. In some embodiments, the message access module 310 may determine whether the .pst password may be overridden. In particular, it may be determined that a network administrator implementing the process 500 may override the .pst password. If it is determined that the password cannot be overridden, the overall process may proceed to block 526. However, if it is determined that the password may be overridden, the overall process may proceed to block 510.

At block 510, a distribution of the messages within the accessed .pst file may be determined. In some embodiments, the distribution of email messages may be determined by the message distribution analysis module 320. The analysis of the distribution of the messages within the .pst file is similar to the analysis performed in block 404 as described above. In particular, the distribution of messages within the .pst file may be analyzed to determine the folder structure of the .pst file (e.g., inbox, outbox, sent messages, folders, subfolders, etc.) and how many email messages are arranged within that folder structure. After the message distribution has been determined, the process may proceed to block 512.

At block 512, a subset or percentage of the email messages analyzed at block 510 may be selected, sampled, and classified. In some embodiments, email messages may be selected by the message sampling module 330. The selection of the subset or percentage of email messages is similar to the selection described above with respect to block 406 and below with respect to FIG. 7. In particular, messages may be randomly selected. Additionally, each folder and subfolder identified at block 510 may have a certain number or percentage of email messages selected for sampling. In some embodiments, certain folders such as the inbox and sent messages may be weighted such that a greater percentage or sampling set may be selected from those folders.

After the subset of email messages has been selected, the selected messages may be classified. For example, the selected messages may be classified as either sent or received based on metadata. In some instances, the metadata may be MAPI properties of the messages. Classification of the email messages at block 512 is similar to the classification of the messages described above with respect to block 408. In particular, each selected message may be classified as either sent or received based on metadata extracted from each email message. After the subset of the email messages has been classified, the overall process may proceed to block 514.

At block 514, an owner for each scanned message may be determined. In some embodiments, the message owner determination module 340 may determine the owner of the scanned messages. The owner may be determined based on MAPI properties of the messages. Determination of the owner for each messages at block 514 is similar to that described above with respect to block 410 and described below with respect to FIG. 8. In particular, messages classified as sent may have owner information extracted from one set of metadata while messages classified as received may have owner information extracted from another set of metadata. After the owner for each scanned message has been determined, the overall process may then proceed to block 516.

At block 516, message statistics may be generated. In some embodiments, the statistics generation module 360 may generate the message statistics. In particular, statistics relating to owner names, email addresses, email message counts, and percentage of total sampled email message may be calculated. After the message statistics have been calculated, the process may proceed to block 518.

At block 518, it may be determined whether an owner selection option has been enabled. In some embodiments, the option determination module 360 may determine whether an owner selection option has been enabled. As described above, a user or administrator may select various options or configurations with respect to determining the owner of a .pst file. One such owner selection option or configuration setting is the "Always Select Most Likely Owner" setting. This setting overrides the success criteria ("sc") setting and always assigns the user with the highest percent share of messages in a .pst file as the owner of the .pst file. If it is determined that the owner selection option has not been selected, the overall process may proceed to block 520. However, if it is determined that an owner selection option has been selected, the overall process may proceed to block 522.

At block 520, it may be determined whether any owner candidate has a total count percentage greater than a predefined success criteria ("sc"). In some embodiments, the owner assignment module 380 may determine whether any owner candidate has a total count percentage greater than the success criteria. This determination is similar to the analysis described above with respect to block 514. In particular, if it is determined that no candidate owners have a total count percentage greater than the success criteria, the overall process may proceed to block 526. However, if it is determined that at least one candidate owners has a total count percentage greater than the success criteria, the overall process may proceed to block 522.

At block 522, the candidate owner with the maximum percentage of messages is selected as the owner for the .pst file. This candidate owner is selected even if the percentage ownership is less than the success criteria used at block 520 based on the owner selection option being enabled. After the candidate owner with the maximum percentage of messages is selected as the owner for the .pst file, the process may proceed to block 524.

The overall process 500 may then repeat periodically or continuously. In some instances, various elements of the overall process may be performed concurrently or sequentially. In particular, the overall process 400 may be implemented with respect to a plurality of .pst files at one time or sequentially. For example, an email archive application implemented across a plurality of client terminals may concurrently implement the process 500 on each client with respect to .pst files stored on the client terminals as part of a remote email archiving workflow.

FIG. 6 shows an email folder structure 600 in accordance with an embodiment of the present disclosure. In some embodiments, the email folder structure 600 may be implemented as part of a .pst file for a particular user. The email folder structure 600 may include an inbox as well as additional unillustrated folders (e.g., sent message folder, deleted message folder, etc.). The folders within the inbox (e.g., Folder 1 and Folder 2) may each contain additional subfolders (Sub Folder 1.1., Sub Folder 1.2, and Sub Folder 2.1, respectively). This is just one example of an email folder structure 600. Any appropriate combination of folders and subfolders may be implemented as part of the email folder structure 600.

FIG. 7 shows a distribution of email messages within the email folder structure 600 in accordance with an embodiment of the present disclosure. In particular, the inbox of email folder structure 600 may contain 2000 email messages, Folder 1 may contain 3000 email messages, Sub Folder 1.1 may contain 2000 email messages, Sub Folder 1.2 may contain 1000 email messages, Folder 2 may contain 1700 email messages, and Sub Folder 2.1 may contain 300 email messages. This is just one example of the possible distribution of messages within folders and variety of different arrangements are possible.

FIG. 7 further shows one example of how the email messages within a .pst file may be sampled as described above with respect to process 400 and process 500. In this example, the total number of items in the .pst file ("t") is 10000. The sample percentage ("s") is 10% of the total number of items which is 1000. The success criteria ("sc") is 50% of the sample percentage which is 500. In addition, the "Always Select Most Likely Owner" setting in this example is not enabled.

Each folder may be sampled at the same rate of 10%. However, in this instance, the inbox is weighted greater while less weight is applied to the remaining folders. In particular, the inbox may be sampled at 12.5% instead of 10% such that 250 messages are sampled instead of 200. As a result, the remaining folders may be sampled less frequently.

Based on the sampling of the messages within the .pst file, two candidate owners may be identified. Candidate owner John Smith may be determined as the owner of 789 emails out of the 1000 sampled. Accordingly, John Smith is determined to own 78.9% of the .pst file. Another candidate owner, John Doe, may be determined as the owner of 211 emails out of the 1000 sampled. Accordingly, John Doe is determined to own 21.1% of the .pst file. Based on the statistics calculated, John Smith will be selected as the owner of the .pst file based on the percent share exceeding the success criteria of 50% and the .pst file will be migrated into John Smith's email archive.

FIG. 8 shows Messaging Application Programming Interface (MAPI) properties that may be utilized to determine ownership in accordance with an embodiment of the present disclosure. Below is a description of the MAPI properties illustrated in the chart. PR_RECEIVED_BY_NAME: Indicates the address property of the messaging user who receives the message. PR_SENDER_NAME: Indicates the address property of the messaging user who sends the message. PR_RCVD_REPRESENTING_NAME: Indicates the address property for the messaging user who is being represented by the receiving user of the message and delegation for receiving. If no messaging user is being represented (i.e., not a delegate functionality) then the value for PR_RCVD_REPRESENTING_NAME is equal to PR_RECEIVED_BY_NAME. PR_SENT_REPRESENTING_NAME: Indicates the address property for the messaging user who is being represented by the sender of the message and delegation for sending. If no messaging user is being represented (i.e., not a delegate functionality) then the value for PR_SENT_REPRESENTING_NAME is equal to PR_SENDER_NAME. PR_RCVD_REPRESENTING_EMAIL_ADDRESS: Contains the e-mail address for the messaging user who is represented by the receiving user. PR_RECEIVED_BY_EMAIL_ADDRESS: Contains the e-mail address for the messaging user who receives the message. PR_SENDER_EMAIL_ADDRESS: Contains the message sender's e-mail address. PR_SENT_REPRESENTING_EMAIL_ADDRESS: Contains the e-mail address for the messaging user who is represented by the sender In at least one embodiment, extracting owner information for each message may be based in the MAPI properties described above. In addition, each message may be classified as either sent or received based on the MAPI properties. Particularly, if an email message contains the MAPI property PR_RECEIVED_BY_NAME then this email message has been received by a messaging user and the message may be classified as received. If an email message doesn't have PR_RECEIVED_BY_NAME property then the email message is classified as sent.

Owner information may be read from the email message based on the classification of sent or received. In particular, for messages classified as sent, PR_SENDER_NAME, PR_SENDER_EMAIL_ADDRESS, PR_SENT_REPRESENTING_NAME, PR_SENT_REPRESENTING_EMAIL_ADDRESS properties may be used to extract owner information. For messages classified as received, PR_RCVD_REPRESENTING_NAME, PR_RCVD_REPRESENTING_EMAIL_ADDRESS, PR_RECEIVED_BY_NAME, PR_RECEIVED_BY_EMAIL_ADDRESS properties may be used to extract owner information.

For an email message which is being transported through delegate functionality, identification of the owner may be based on difference in value of properties. For messages classified as sent, if PR_SENDER_NAME and PR_SENT_REPRESENTING_NAME have different values then the message is sent by a user on behalf of another user and the owner may be selected as the value of PR_SENT_REPRESENTING_NAME. For messages classified as received, if PR_RECEIVED_BY_NAME and PR_RCVD_REPRESENTING_NAME have different values then the message is received by user on behalf of another user and the owner may be selected as the value of PR_RCVD_REPRESENTING_NAME.

At this point it should be noted that determining ownership of files and/or email messages in accordance with the present disclosure as described above may involve the processing of input data and the generation of output data to some extent. This input data processing and output data generation may be implemented in hardware or software. For example, specific electronic components may be employed in the determining ownership of files and/or email messages or similar or related circuitry for implementing the functions associated with determining ownership of files and/or email messages in accordance with the present disclosure as described above. Alternatively, one or more processors operating in accordance with instructions may implement the functions associated with determining ownership of files and/or email messages in accordance with the present disclosure as described above. If such is the case, it is within the scope of the present disclosure that such instructions may be stored on one or more non-transitory processor readable storage media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of at least one particular implementation in at least one particular environment for at least one particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A method for determining file ownership comprising:
   determining, using at least one processor, a distribution of a plurality of email messages stored within a file;
   selecting a preset number of email messages from the plurality of email messages based on the determined distribution of the plurality of email messages stored within the file;
   extracting metadata from each of the preset number of email messages;
   classifying each of the preset number of email messages based on the extracted metadata;
   determining an owner of each of the preset number of email messages based on the classification of each email message by analyzing the metadata of each of the preset number of email messages;
   calculating statistics for the preset number of email messages based on the determined owner of each of the preset number of email messages; and
   assigning ownership to the file based on the calculated statistics.

2. The method of claim 1, wherein the plurality of email messages are arranged in at least one folder of the file.

3. The method of claim 2, wherein the file contains a plurality of folders and each folder contains at least one of the plurality of email messages.

4. The method of claim 3, wherein the preset number of email messages are randomly selected and include at least one email message from each folder.

5. The method of claim 1, wherein each of the preset number of email messages is classified as sent or received.

6. The method of claim 5, wherein the email message is classified as received when the email message metadata contains receiver properties and sender properties, and the email message is classified as sent when the email message metadata contains sender properties but does not contain receiver properties.

7. The method of claim 6, wherein the metadata includes Messaging Application Programming Interface (MAPI) properties.

8. The method of claim 7, wherein the owner of each of the preset number of email messages is determined by analyzing a first MAPI property of the respective email message when the respective email message is classified as sent and by analyzing a second different MAPI property of the respective email message when the respective email message is classified as received.

9. The method of claim 8, wherein the statistics indicate a percentage of the preset number of email messages owned by the owner and the ownership to the file is assigned to the owner when the percentage exceeds a predetermined threshold.

10. The method of claim 1, wherein the file is a Personal Storage Table (.pst) file.

11. The method of claim 1, wherein the owner is one of a plurality of email users.

12. The method of claim 11, further comprising:
    accessing the file containing the plurality of email messages.

13. The method of claim 12, wherein the file is stored in memory on a client terminal.

14. The method of claim 13, further comprising:
    archiving the file to a remote server based on the assigned ownership.

15. At least one non-transitory processor readable storage medium storing a computer program of instructions configured to be readable by at least one processor for instructing the at least one processor to execute a computer process for performing the method as recited in claim 1.

16. The method of claim 1, wherein the preset number of email messages is less than all of the plurality of email messages.

17. A method for determining an owner of an email message comprising:
    extracting, using at least one processor, metadata from the email message, wherein the metadata includes Messaging Application Programming Interface (MAPI) properties;
    classifying the email message as sent or received based on the extracted metadata; and
    determining an owner of the email message based on the classification of the email message by analyzing a first portion of the metadata when the email message is classified as sent and by analyzing a second portion of the metadata when the email message is classified as received.

18. The method of claim 17, wherein the email message is classified as received when the email message contains receiver properties and sender properties.

19. The method of claim 18, wherein the email message is classified as sent when the email message contains sender properties but does not contain receiver properties.

20. A system for determining file ownership comprising:
    one or more processors communicatively coupled to a network; wherein the one or more processors are configured to:
    determine a distribution of a plurality of email messages stored within a file;
    select a preset number of email messages from the plurality of email messages based on the determined distribution of the plurality of email messages within the file;
    extract metadata from each of the preset number of email messages;

classify each of the preset number of email messages based on the extracted metadata;
determine an owner of each of the preset number of email messages based on the classification of each email message by analyzing the metadata of each of the preset number of email messages;
calculate statistics for the preset number of email messages based on the determined owner of each of the preset number of email messages; and
assign ownership to the file based on the calculated statistics.

\* \* \* \* \*